Patented Sept. 4, 1928.

1,683,241

UNITED STATES PATENT OFFICE.

PEIRCE CUTLER, OF BURLINGAME, CALIFORNIA, ASSIGNOR TO EDWARD J. JUDGE, OF ALAMEDA, CALIFORNIA.

FILLING CONTAINER WITH PRESERVING, FLAVORING, AND CONDIMENT LIQUIDS.

No Drawing.   Application filed April 9, 1927.   Serial No. 182,542.

My invention relates to that part of the preserving art which involves the addition of a liquid to the cans, jars, glassware or other receptacles in which the food or beverage product is contained, said liquid being a syrup, brine, flavor, sauce or preserving or condiment liquid of any nature according to the character of the product.

It is to be understood that my invention applies to this step in the art whatever may be the food or beverage product or the preserving or condiment liquid to be added thereto; but for the sake of simplifying the disclosure, I shall herein describe my improvement in terms of fruit-canning and particularly refer to that step which is known in this art as "syruping."

The present practise is to add to the fruit filled cans, syrup of the proper consistency or grade; then to subject the cans to the "first-cook" by passing them through the "exhaust" box, by which sufficient heat is applied to expand the contents to drive out the air; then to immediately apply and permanently seam on the can covers, thereby hermetically sealing the cans, and then finally to subject the sealed cans to the "second cook" by passing them through the "cooker" for the final heat. In this common practise, it is to be noted that the syrup which is added is already of the required consistency or grade and is supplied to the full can capacity. From these facts flow all the disadvantages which I shall presently recite, and which it is the object of my improvement to overcome. From a consideration of these disadvantages and a comparison with the advantages of my method, the nature of my improvement as I shall now describe it will be fully understood.

In what I now deem the best way of carrying out my invention I proceed as follows:—

I first prepare a single concentration of the syrup, by any well known method of concentration, unnecessary herein to describe.

For an example, I will concentrate the syrup to 60 or 80 degrees Ballings test. Then according to character of the fruit and the ultimate consistency or grade desired to be used with said fruit, I supply the cans either before or after the fruit is packed, with such an amount of this concentrated syrup as will by the subsequent addition of water reduce it to such consistency or grade. The cans with the fruit and only this small percentage or volume of concentrated syrup, are then subjected to the "first cook" in the exhaust box. The heat thus applied will effect the permeation of the concentrated syrup throughout the fruit mass, and prepare the contents for the vacuum or exhaust subsequently to transpire. Now, when this "first cook" is complete, and while still under its influence, I fill the cans with hot water; then I immediately seal them (in practise by applying the heads or covers in the "double seamer") and proceed with the second or final cook in the cooking machine. In this second cook, the mixture of the water and syrup takes place so that the confined liquid will be diluted syrup of the predetermined grade.

In the common practise, it is customary to make a number of grades of syrup and to have a tank for each grade, and supply pipes leading from each tank to the filling device. It is also the practise to supply the can with its proper grade to its full capacity, generally overflowing, and to tip out the surplus in order to bring it down to its proper level to provide for the expansion due to the first cook.

In this practise there is loss as follows:—

First—by the spoiling of the weaker solutions or grades, due to standing.

Second—by leakage from the numerous conveying pipes.

Third—by the difference in strength of syrup left in the filling device, when a change is made from one grade to another.

Fourth—by the amount of solution which clings to the side of the can when it overflows, or is tipped out.

Fifth—by the amount of the discarded surplus, which is only, at best, partially compensated for by any attempt to return it for re-use.

Sixth—by the weakening of the solution due to the water of condensation when steam is used as the heating medium for the exhaust box, in which, of course, the cans are still open on top.

Seventh—by the amount of solution which overflows due to expansion in the exhaust box, or is spilled out by the jostling or disturbance of the cans therein.

Eighth—by overflow or evaporation, if the cans are not subjected to the exhaust box, but the first cook is gained by adding the syrup hot.

Ninth—by "swells", that is, leaky cans, due to the expansion of sour syrup.

Tenth—by the spilling of the solution in the operation of double-seaming or sealing the covers on.

Eleventh—by the extra labor in making several strengths of syrups.

By my method there is a saving as follows:—

First—a concentrated solution, which does not spoil as quickly as weaker solutions do.

Second—the necessity for but one pipe or conveyer.

Third—it is only necessary to vary the amount of the concentrated syrup placed in the can.

Fourth—no syrup overflows the can at any stage of the proceeding. Only water will overflow, or be tipped out, or spilled out, or evaporated or wasted in any manner, because at all stages including that of sealing, the water is on top of the syrup and is only mixed therewith during the "second" or final cook, at which time the can is hermetically sealed. This is true regardless of when the water is added. It may be added prior to the "first cook" in which case, fifth—condensing steam in the exhaust box will not have any bad effect; and, sixth—if the "first cook" be not that of an exhaust box, but be attained by the addition to the concentrated syrup of boiling water, only the latter will be subject to waste as it will still be on top.

Seventh—no syrup is wasted by spilling in the sealing process, as the water is still on top.

Eighth—there is less labor needed in the preparation of a single grade of syrup.

Ninth—by placing the concentrated syrup in the can, then passing it through the first cook or exhaust box, and then adding the hot reducing water, as I have above described, the fruit absorbs the solution better, causes no waste by boiling over, and the can contents are sealed without loss of heat.

From the foregoing, it will be seen that my improvement lies essentially in first supplying to the containers a concentrated solution and subsequently bringing the strength of this concentrated solution to the proper grade by the addition to said containers of a reducing liquid. This liquid may be added hot or cold, and before or after the food is packed in the containers.

I claim:—

1. The improvement in the art of filling product-containers with preserving, flavoring and condiment liquids which consists in supplying the container with a concentrated solution of said liquid; and then adding to said concentrated solution within the container a reducing liquid to bring the liquid-content of the container to the proper strength.

2. The improvement in the art of filling product-containers with preserving, flavoring and condiment liquids which consists in supplying the container with a concentrated solution of said liquid; then adding to said concentrated solution within the container a reducing liquid to bring the liquid-content of the container to the proper strength, and then hermetically sealing said container.

3. The improvement in the art of filling product-containers with preserving, flavoring and condiment liquids which consists in supplying the container with a concentrated solution of said liquid; filling in on top of the concentrated solution in the container a volume of a reducing liquid capable when mixed with said solution of bringing the liquid-content of the container to the proper strength; hermetically sealing the container; and finally subjecting the sealed container to heat sufficient to mix the liquid-content and cook the product.

4. The improvement in the art of filling product-containers with preserving, flavoring and condiment liquids which consists in supplying the container with a concentrated solution of said liquid; filling in on top of the concentrated solution in the container a volume of a reducing liquid capable when mixed with said solution of bringing the liquid content of the container to the proper strength; subjecting the container-content to sufficient heat before or after the addition of the reducing liquid to provide for air-exhaust preliminary to hermetically sealing said container; then sealing the container hermetically; and finally subjecting the sealed container to heat sufficient to mix the liquid-content and cook the product.

5. The improvement in the art of filling product-containers with preserving, flavoring and condiment liquids, which consists in supplying the container with a concentrated solution of said liquid; filling in on top of the concentrated solution in the container a volume of a reducing liquid capable when mixed with said solution of bringing the liquid-content of the container to the proper strength, said reducing liquid being hot when added as described; hermetically sealing the container; and finally subjecting the sealed container to heat sufficient to mix the liquid-content and cook the product.

6. The improvement in the art of filling product-containers with preserving, flavoring and condiment liquids, which consists in supplying the container with a concentraed solution of said liquid; subjecting said container with its product-content and concentrated liquid solution to the heat of a first cook; filling in on top of the concentrated solution and product-content in the container a volume of hot reducing liquid capable when mixed with said solution of bringing the liquid-content of the container to the proper strength; then immediately hermetically sealing the container; and finally subjecting the sealed container to the heat of the second or final cook.

In testimony whereof I have signed by name to this specification.

PEIRCE CUTLER.